(12) United States Patent
Strand et al.

(10) Patent No.: US 11,076,342 B1
(45) Date of Patent: Jul. 27, 2021

(54) RESTRICT DATA ACCESS BASED ON CELLULAR NETWORK

(71) Applicant: Expeto Wireless Inc., Vancouver (CA)

(72) Inventors: Terje Strand, San Francisco, CA (US); Brian Anderson, Vancouver (CA)

(73) Assignee: Expeto Wireless Inc., Vancouver (CA)

( * ) Notice: Subject to any disclaimer, the term of this patent is extended or adjusted under 35 U.S.C. 154(b) by 0 days.

(21) Appl. No.: 16/879,675

(22) Filed: May 20, 2020

(51) Int. Cl.
*H04W 48/08* (2009.01)
*H04W 8/04* (2009.01)
*H04W 76/18* (2018.01)

(52) U.S. Cl.
CPC ............. *H04W 48/08* (2013.01); *H04W 8/04* (2013.01); *H04W 76/18* (2018.02)

(58) Field of Classification Search
CPC ... H04W 4/50; H04W 12/00514; H04W 4/60; H04W 8/04; H04W 8/26; H04W 8/10; H04W 88/02; H04W 36/08; H04W 76/10; H04W 8/06; H04W 8/08; H04W 48/08; H04W 76/18
See application file for complete search history.

(56) References Cited

U.S. PATENT DOCUMENTS

| | | | | |
|---|---|---|---|---|
| 10,594,499 | B1* | 3/2020 | Deshpande | H04M 15/66 |
| 2008/0082669 | A1* | 4/2008 | Williams | H04L 63/166 |
| | | | | 709/227 |
| 2018/0160387 | A1* | 6/2018 | Chastain | H04W 60/04 |

* cited by examiner

*Primary Examiner* — Fred A Casca
(74) *Attorney, Agent, or Firm* — Klarquist Sparkman, LLP

(57) ABSTRACT

Technologies are described for restricting access within a cellular telecommunications environment. For example, the technologies described herein can be used to allow cellular devices to connect to cellular networks even when the cellular networks are disallowed. However, the connections to cellular networks that are disallowed can be handled differently from connections to cellular networks that are allowed. For example, when a cellular device is allowed to connect to a disallowed cellular network, the connection can be directed to a particular packet data network gateway (PGW), such as a blocked PGW.

18 Claims, 7 Drawing Sheets

US 11,076,342 B1

RESTRICT DATA ACCESS BASED ON CELLULAR NETWORK

BACKGROUND

Organizations that manage cellular devices want to be able to manage those devices, regardless of where the devices are located. For example, an organization may want to manage its cellular devices to check their status (e.g., location information), obtain reporting information, deliver configuration updates, or for other reasons.

When a cellular device is in a location (e.g., a country) with a cellular network that the cellular device can connect to (e.g., its home cellular network or a cellular network with a roaming agreement), connecting to the cellular device can be a straightforward task. However, when the cellular device is in a location without a cellular network that the cellular device can connect to, then the cellular device may be inaccessible. This can happen, for example, when the cellular device travels to a different country and cannot access (e.g., is refused a connection to) the cellular networks available in the different country. When this happens, it may be difficult or impossible for the organization to contact or manage the cellular device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for restricting access within a cellular telecommunications environment. For example, the technologies described herein can be used to allow cellular devices to connect to cellular networks even when the cellular networks are disallowed. However, the connections to cellular networks that are disallowed can be handled differently from connections to cellular networks that are allowed. For example, when a cellular device is allowed to connect to a disallowed cellular network, the connection (e.g., a data session) can be directed to a particular packet data network gateway (PGW), such as a blocked PGW. For example, the blocked PGW can restrict (e.g., block or reject) the data session.

DETAILED DESCRIPTION

Overview

Figure 1:
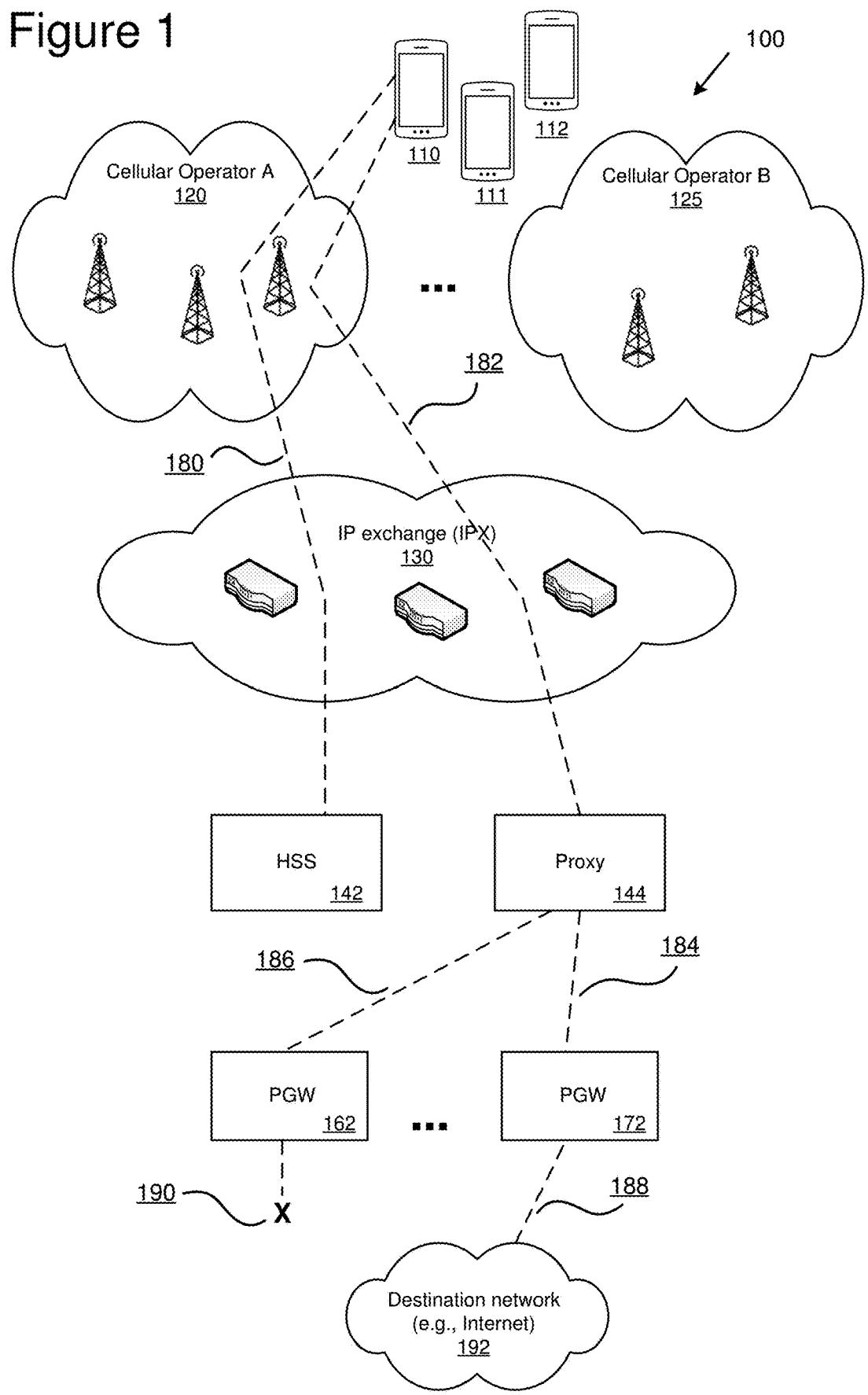
FIG. 1 is a is a diagram depicting an example cellular telecommunications environment.

The following description is directed to technologies for restricting access within a cellular telecommunications environment. For example, the technologies described herein can be used to allow cellular devices to connect to cellular networks even when the cellular networks are disallowed. However, the connections to cellular networks that are disallowed can be handled differently from connections to cellular networks that are allowed. For example, when a cellular device is allowed to connect to a disallowed cellular network, the connection (e.g., a data session) can be directed to a particular packet data network gateway (PGW), such as a blocked PGW. For example, the blocked PGW can restricts (e.g., block or reject) the data session.

In some implementations, the technologies are implemented at least in part by a home subscriber server (HSS) and a proxy. For example, the HSS can accept connections from cellular devices. The cellular devices can connect via cellular networks that are allowed and via cellular networks that are disallowed. In other words, the HSS can accept (establish) the connection regardless of whether the cellular device is connecting via a cellular network that is allowed or a cellular network that is disallowed. For example, the HSS can allow the cellular device to attach even if the cellular network is not preferred. The proxy can route data (e.g., a data session) of the cellular device to different PGWs based on whether the cellular device is connecting via a cellular network that is allowed or a cellular network that is disallowed. For example, if the cellular device is connecting via a disallowed cellular network, the proxy can direct data form the cellular device to a blocked PGW (e.g., a PGW that rejects the data session or that accepts and drops data packets). If the cellular device is connected via an allowed cellular network, the proxy can direct data from the cellular device to an unblocked PGW (e.g., a normal PGW that routes the data to its destination).

As used herein, a cellular network refers to a wireless communication network operated by a particular cellular operator in a particular country. One example of a cellular network is the AT&T® cellular network that operates in the United States. Another example of a cellular network is the T-Mobile® cellular network that operates in the United States. Another example of a cellular network is the China Telecom® cellular network that operates in China. A cellular network is defined by a public land mobile network (PLMN) code, with each cellular network having its own unique PLMN code. A PLMN code comprises a mobile country code (MCC) and a mobile network code (MNC).

A customer (e.g., an enterprise business or organization that operates cellular devices) may want the ability to restrict which cellular networks the customer's cellular devices can connect to. For example, the customer may want to prevent its cellular devices from connecting to specific cellular networks (e.g., that are deemed too expensive or that are located in countries where security and/or privacy is a concern). In existing solutions, the customer can prevent its cellular devices from connecting to such cellular networks (e.g., causing the cellular devices to receive a "forbidden PLMN" error message when trying to connect to a cellular network that is not allowed). However, preventing its cellular devices from connecting can limit the ability for the customer to obtain useful information. For example, if the customer's cellular device is in a geographical location (e.g., a country) where the cellular device cannot connect (e.g., where there are no allowed cellular networks available), then the customer may have no way locate or access the cellular device (e.g., the cellular device may be lost). For example, the customer may not know that the cellular device has traveled to a restricted country. As another example, if the cellular device is in a location with no allowed cellular networks, the customer may be unable to configure the cellular device (e.g., to change settings, access reporting data, etc.).

The technologies described herein provide advantages over previous solutions. For example, cellular devices can be allowed to connect with restricted access to cellular networks that are disallowed. Allowing cellular devices to connect in this manner can enable the customer to access the cellular devices (e.g., to determine their location, to obtain metadata, to administer the devices, etc.). For example if a cellular device, such as a laptop computer, travels to a country without an allowed cellular network, the cellular device can still connect to a disallowed cellular network (e.g., one to which the cellular device would normally not be able to connect to) which can allow the customer to track the cellular device, obtain status information, etc. The cellular device can connect to the disallowed cellular network even if the disallowed cellular network is very expensive or has security or privacy issues (e.g., to send a small amount of location or status data). For example, the cellular device can connect to the disallowed cellular network only at the signaling stage (e.g., without allowing a data session), which can still report location information and other metadata.

A disallowed cellular network is one to which the cellular device would normally not connect to. Specifically, a disallowed cellular network is defined as a mobile operator instance (defined by one or more PLMN codes) or as a specific region of one mobile operator (defined as a PLMN code and location metadata included in the signaling, such as Cell-Ids). One or more disallowed cellular networks can be defined in this manner (e.g., that one or more specific PLMNs are disallowed for one or more identified cellular devices). Similarly, one or more allowed cellular networks can be defined. For example, a customer could define that a cellular device is only 'allowed' in San Francisco on the T-Mobile network, and any cellular network that is not T-Mobile in the San Francisco geographical area would therefore be disallowed for that cellular device. Furthermore, allowed cellular networks can be determined based on a list of one or more disallowed cellular networks (e.g., if a given cellular network is not in the list of disallowed cellular networks, then it is allowed).

Cellular Operator Selection Stage

The technologies described herein can be used to control which cellular network the cellular device will connect to. For example, a cellular device (e.g., a smart phone) can have the ability to connect to a number (e.g., two or more) of different cellular networks of different cellular operators. As an example, the cellular device may have the option to connect to an AT&T® cellular network, to a T-Mobile® cellular network, and/or to other cellular networks.

In some implementations, the cellular device changes its international mobile subscriber identity (IMSI) in order to control which cellular operator the cellular device connects to. For example, the cellular device can select the specific IMSI to use (e.g., from a list of available IMSI numbers that are associated with respective different cellular operators) depending on which cellular operator is available (e.g., select a specific IMSI when the cellular device detects that a China Telecom® cellular network is available). The cellular device can select the particular IMSI based on a policy (e.g., to allow particular cellular operators, to disallow particular cellular operators, to prefer particular cellular operators over others, etc.).

In some implementations, the cellular device is controlled via a multi-profile subscriber identity module (SIM), such as an embedded-SIM (eSIM) and/or embedded universal integrated circuit card (eUICC). For example, using one or more of these multi-profile technologies can allow the cellular device to switch its IMSI in order to connect to a selected cellular operator.

The cellular device can also connect to a cellular mobile operator (e.g., regardless of whether the cellular operator is associated with the IMSI currently used by the cellular device). For example, when the cellular device is roaming, it can attempt to connect to cellular operators in a specific order (e.g., in a pre-configured order of preference), which can be based on a policy.

One or more of the following techniques can be used to control which cellular network the cellular device will connect to:

Change the cellular device's IMSI selection algorithm and parameters
Add and/or remove IMSIs
Switch the eSIM profile
Add and/or remove eSim profiles
Configuration of public land mobile network (PLMN) list and forbidden PLMN (FPLMN) list In some implementations, the cellular device is managed after it is deployed. For example, another entity of the cellular network (e.g., the HSS or the command and control service) can manage the cellular device. For example, the entity can instruct the cellular device to change its IMSI (e.g., upon detecting that the cellular device is trying to connect via a particular mobile operator). The entity can also send configuration updates to the cellular device (e.g., send updates to add/remove/update eSIM profiles). Such control can be performed mid-session (e.g., the entity can detect a change in policy and disconnect the cellular device mid-session).

HSS Stage

In the technologies described herein, the home subscriber server (HSS) (e.g., comprising the home location register (HLR)) can be used to control the data path. At this stage, the inbound (from the cellular device) signaling path can be controlled via the HSS. For example, when the cellular device is attempting to authenticate with the HSS, IMSI steering can be performed to influence which cellular operator the cellular device will use. IMSI steering can include disallowing one or more specific cellular operators, preferring one or more specific cellular operators, and/or performing other steering operations. In some cases, IMSI steering is used to enforce a policy (e.g., to reject initial connection attempts for a specific cellular operator so that the cellular device will try to connect other cellular operators first, and if the cellular device fails to connect to the other cellular operators the HSS can accept the connection).

Management of the data path by the HSS can also be controlled after the cellular device has authenticated. For example, the cellular device can be disconnected mid-session (e.g., by sending a cancel operation to the cellular device).

Management at the HSS can also control the data path by controlling which POP the cellular device connects to. For example, if the cellular device is attempting to authenticate with a specific HSS associated with a specific POP (e.g., a specific POP that serves a specific cellular operator and that is located in a specific geographical location), the authentication request can be approved (e.g., to allow the cellular device to use the data path through the specific cellular operator) or denied (e.g., to prevent the cellular device from using the data path through the specific cellular operator).

Proxy Stage

In the technologies described herein, the data path can be controlled at the proxy stage. At the proxy stage, the cellular device is attached to the cellular network (e.g., the cellular device has authenticated with the HSS). For example, the proxy stage can begin when the cellular device has completed its signaling (e.g., including authentication) with the HSS, and the cellular device has now requested an Internet Protocol (IP) address to begin a data session (e.g., to communicate with a web server, email server, etc.). This request is received by the proxy, and the proxy can make a number of decisions about how the data session is established and where it is routed. For example, the proxy can control how the data session is routed (the data path for the data session) to the PGW (the outbound data path), including determining which PGW to use for the data session.

In some implementations, the proxy routes the data session to a different PGW depending on whether the cellular operator is an allowed cellular operator or a disallowed cellular operator. For example, the proxy uses metadata to make the determination (e.g., the cellular operator's PLMN code and/or other metadata). If the cellular operator is disallowed, then the proxy routes the data session to a blocked PGW. If the cellular operator is allowed, then the proxy routes the data session to a normal PGW.

For example, a number of different PGWs can be maintained (e.g., by a customer and/or by a service provider). The different PGWs can include a number (e.g., one or more) of blocked PGWs and a number (e.g., one or more) of normal PGWs. The normal and/or blocked PGWs can be located in the same country or in different countries. For example, a customer could operate a blocked PGW and a normal PGW in a customer network (e.g., an enterprise cloud environment).

The proxy can determine which PGW to use based on various criteria (e.g., based on various types of metadata). In some implementations, one or more of the following types of metadata can be used by the proxy.

- Country (e.g., which country the cellular device is in, which can be based on the cellular operator, cell tower, and/or other information indicating location of the cellular device)
- Cellular operator and/or RAN (e.g., the specific cellular operator and/or RAN that the cellular device is connecting through), which can include the PLMN code
- Location (e.g., which cell tower the cellular device is connected to)
- Radio type (e.g., whether the cellular device is using 3G, 4G, etc.)
- Device type (e.g., determined by the cellular device's International Mobile Equipment Identity (IMEI)
- Access point name (APN)
- Static subscriber data The proxy can control the inbound data path. For example, the proxy can deny the inbound data flow. The proxy can also perform other actions, such as reporting, based on the inbound data flow.

PGW Stage

In the technologies described herein, the data path can be controlled at the PGW stage. At the PGW stage, the cellular device is attached to the cellular network (e.g., the cellular device has authenticated with the HSS) and a data session has been initiated with a specific PGW. Typically, the PGW first assigns an IP address to the cellular device.

When the PGW is a blocked PGW, the data session is restricted in some way. For example, the blocked PGW can restrict the data session using a temporary error code (e.g., in response to a data session request according to the GPRS tunneling protocol (GTP), such as the GTP-C protocol). In some implementations the temporary error code causes the cellular device to continuously retry to establish the session (e.g., with a relatively long retry interval).

The blocked PGW can also restrict the data session by accepting data packets from the cellular device and then dropping or otherwise discarding the data packets (e.g., without sending a response to the cellular device).

The blocked PGW can also restrict the data session by only allowing some (but not all) traffic. For example, only inbound SSH traffic can be allowed (e.g., for administrative access) while denying all other inbound traffic.

The blocked PGW can also be in a restricted network environment. For example, the blocked PGW can be configured so that it does not have access to the Internet, thus preventing the cellular device from accessing the Internet. For example, the blocked PGW can return a network error (e.g., indicating that the destination is unreachable).

When the PGW is a normal PGW, the data session is handled normally. For example, the normal PGW routes the data session to its destination (e.g., within a customer network, to the Internet, and/or to another).

The PGW can also perform various operations to enforce the inbound data path between the PGW and the cellular device. For example, the PGW can determine if the proxy being used in the inbound data path (the proxy through which the inbound data path is traveling) is the correct proxy (e.g., by checking a policy or other configuration information). If the proxy is not correct (e.g., if the proxy is not the authorized proxy, or one of the authorized proxies, for a specific cellular device), then the PGW can terminate the connection or take some other action (e.g., alert an administrator).

The PGW can also provide IP security and networking services, such as firewall services, network address translation (NAT) services, deep packet inspection services, etc. The PGW can also provide additional network routing functionality, such as supporting routing to a subnet accessed via the cellular device (e.g., which can be placed into bridge mode).

The PGW can also perform monitoring and reporting functions. For example, the PGW can monitor the inbound data path and/or the outbound data path and report (e.g., log data, send alerts, etc.) based on various criteria (e.g., alert if a policy restricting access to certain destinations is violated).

Policies

In the technologies described herein, restricting access can be performed according to policies. In some implementations, policies comprise indications of allowed and/or disallowed mobile operators (e.g., whitelists and/or blacklists defined by rules and/or PLMN codes). For example, the policy could indicate that the AT&T cellular network is allowed and/or that the Deutsche Telekom® cellular network is disallowed.

Policies can also be provided for controlling data paths. For example, policies can comprise indications of allowed (e.g., via whitelists) and/or disallowed (e.g., via blacklists) countries. For example, a policy could indicate that the data path (e.g., for one or more identified cellular devices) is allowed to travel through the U.S., but not China.

In some implementations, policies comprise indications of allowed and/or disallowed data paths. For example, the policy could indicate that the data path for a specific customer's cellular devices cannot go through the customer's Singapore POP if the cellular device is located outside Asia.

Policies can be translated to generate configuration updates. In some implementations, configuration updates are generated for SIMs. For example, configuration updates can be generated to apply policies for changing IMSIs, adding/removing/updating eSIM profiles, and/or performing other configuration updates related to cellular device SIMs. Configuration updates can be delivered to cellular devices using over-the-air (OTA) remote SIM provisioning (RSP) technology.

In some implementations, configuration updates are generated for HSSs. For example, configuration updates can be generated to apply policies related to allowed and/or disallowed mobile operators. The configuration updates can comprise IMSI steering rules, disconnection rules, reporting rules, and/or other types of configuration updates.

In some implementations, configuration updates are generated for proxies. For example, configuration updates can be generated to apply policies related to allowed and/or disallowed mobile operators and to routing to various PGWs (e.g., blocked and normal PGWs). The configuration updates can comprise routing updates, reporting rules, and/or other types of configuration updates.

In some implementations, configuration updates are generated for PGWs. For example, configuration updates can be generated to apply policies related to inbound and/or outbound data paths. The configuration updates can comprise routing updates, reporting rules, and/or other types of configuration updates.

Command and Control Service

In the technologies described herein, access restrictions can be managed via a command and control service. The command and control service is a separate entity from the other entities of the cellular network (e.g., the cellular devices, the cellular operators, the IPX, the POPs, the PGWs, and the customer networks. The command and control service manages policies for restricting access and/or managing data paths.

The command and control service can receive policies from users. For example, an administrator (e.g., a user associated with the customer) or another user can configure policies via the command and control service. In some implementations, the command and control service provides an application programming interface (API) for receiving policies (e.g., via software applications running on other systems). The command and control service can also receive policies via a user interface (e.g., a graphical user interface) provided directly by the command and control service (e.g., as a web service).

The command and control service can be implemented by hardware and/or software resources (e.g., in a data center or cloud service). The command and control service can be run by a customer or by a service provider (e.g., a service provider that that provides the access restriction technologies described herein).

In some implementations, the command and control service communicates with agents located with (e.g., co-located), or associated with, various entities of the cellular network. For example, an agent (also called a command and control agent) can be located with each HSS, proxy, and/or POP. Agents can also be located with PGWs and/or cellular devices. Agents can be implemented using software and/or hardware resources. For example, an agent that is located in a POP can run on computer server resources of the POP (e.g., servers in a data center), which can be the same computer server resources or different computer server resources which implement the HSS and/or proxy.

In some implementations, access restriction is implemented by the command and control service via the agents. For example, the command and control service can send (e.g., push) configuration updates to the agents, and the agents can in turn apply the configuration updates to the various entities (e.g., perform local updates). For example, the command and control service can send configuration updates to an agent located in a particular POP. The agent in the particular POP can receive the configuration updates and apply them to the HSS and/or proxy of the particular POP. The agents can also receive and process data from the various entities and communicate results to the command and control service. For example, the agent associated with the particular POP can receive monitoring data from the HSS and/or proxy of the particular POP and send the monitoring data to the command and control service. The agent can also process the monitoring data (e.g., sending results to the command and control service, generating alerts, etc.).

Monitoring and Reporting

In the technologies described herein, monitoring data can be generated by the various entities of the cellular telecommunications environment (e.g., by the HSSs, proxies, PGWs, etc.). The monitoring data can be used in various ways. For example, the monitoring data can be used to report statistics (e.g., usage statistics, such as connection requests and data usage), to generate alerts (e.g., to alert an administrator when a cellular device connects via a disallowed cellular network, when a data session is routed to a blocked PGW, etc.), and for other monitoring and reporting purposes.

Monitoring data can be generated directly by the entities and/or by the command and control service. The entities can also generate monitoring data and send the monitoring data (e.g., as raw data and/or process data) to the command and control service. The command and control service can obtain monitoring data from the entities and process it in the ways described herein (e.g., log or report the data, generate alerts, etc.).

Telecommunications Environment for Restricting Data Access

FIG. 1 is a diagram depicting an example cellular telecommunications environment 100 that can be used for restricting data access for cellular network data. For example, using the technologies described herein, cellular devices can connect to cellular networks that are disallowed, but with restricted access.

The example cellular telecommunications environment 100 includes a number of cellular devices 110-112. The cellular devices 110-112 can be any type of device (e.g., computing device) that is associated with a cellular radio (e.g., a smart phone, a laptop computer, a tablet, a sensor device, an Internet of things (IoT) device, and/or another type of computing device that has a cellular radio). The cellular devices 110-112 can also be associated with other types of objects (e.g., a shipping container that has an attached or integrated cellular device, which can be used to track its location, report status, etc.). The cellular devices 110-112 connect to cellular operators (also referred to as cellular networks or mobile operators)

For example, in order for cellular device 110 to communicate with a destination device on the Internet (e.g., a web server or other Internet service), the cellular device has to go through a sequence of cellular network operations that can involve various devices within the network. For example, the cellular device may have to first establish a cellular network connection with a cellular operator, then authenticate with an HSS, then initiate a data session with a proxy, then establish the data session with a PGW, and finally communicate data with the destination device on the Internet.

In the example cellular telecommunications environment 100, there are two cellular operators depicted, cellular operator A 120 and cellular operator B 125. For example, cellular operator A 120 could be AT&T and cellular operator B 125 could be T-Mobile. Cellular operator A 120 and cellular operator B 125 could be located in different countries (e.g., cellular operator A 120 could be AT&T in the United States and cellular operator B 125 could be Deutsche Telekom® in Germany). While only two example cellular operators are depicted for ease of illustration, the example cellular telecommunications environment 100 can include any number of cellular operators, which can be located in various different countries.

The example cellular telecommunications environment 100 depicts an IP exchange (IPX) 130. The IPX 130 is a telecommunications interconnection network for exchanging cellular network traffic between customers of different cellular operators. In other words, the IPX 130 is a private backbone serving cellular operators. The IPX 130 is different than, and separate from, the Internet.

In the example cellular telecommunications environment 100, there is an HSS 142. The HSS 142 is external to, and independent of, the cellular operators. The HSS 142 manages the inbound signaling portion of the data path from the cellular device to the HSS 142. For example, the technologies described in the "HSS Stage" section can be used to control which cellular operator the cellular device connects to. As depicted in the cellular telecommunications environment 100, cellular device 110 has connected, via inbound signaling path 180, to HSS 142.

Restricting data access within the cellular telecommunications environment 100 can be performed, at least in part, by the HSS 142. For example, the HSS 142 can accept connections from cellular devices (e.g., cellular devices 110-112) even if the cellular devices are connecting via cellular networks that are disallowed. For example, the HSS 142 can accept a connection from cellular device 110 even though cellular operator A 120 is disallowed. Therefore, the HSS 142 is different from a traditional HSS because a traditional HSS will make the decision whether to allow the cellular devices to attach.

In the example cellular telecommunications network 100, there is a proxy 144. The proxy 144 is external to, and independent of, the cellular operators. The proxy 144 manages the data path from the cellular device, through the proxy 144, to the PGW. For example, the technologies described in the "Proxy Stage" section can be used to control the inbound data path (from the cellular device to the proxy) and/or the outbound data path (from the proxy to the PGW).

Restricting data access within the cellular telecommunications environment 100 can be performed, at least in part, by the proxy 144. For example, the proxy 144 can receive a request from the cellular device (e.g., from cellular device 110) to start a data session. The proxy 144 can analyze metadata associated with the request, the cellular operator (e.g., cellular operator A 120), and/or the cellular device (e.g., cellular device 110). The proxy 144 can determine (e.g., based at least in part on the metadata) which PGW to route the data session to.

In the example cellular telecommunications environment 100, PGW 162 is a blocked PGW that restricts the data session in some way. For example, PGW 162 can block or reject the data session. PGW 172 is a normal PGW that does not restrict the data session (also referred to as an unblocked PGW).

In some implementations, the proxy 144 routes the data session to a different PGW (e.g., selected from a plurality of different PGWs) depending on whether the cellular operator is a disallowed cellular operator or an allowed cellular operator. To illustrate the decision that the proxy 144 makes, consider the data path 182 from the cellular device 110 to the proxy 144. If cellular operator A 120 is a disallowed cellular operator (e.g., by comparing a PLMN code of cellular operator A 120 to a list of disallowed PLMN codes), then proxy 144 determines that the data session should be routed to PGW 162 (which is a restricted PGW), as indicated by data path 186. PGW 162 restricts (e.g., blocks or rejects) the data session in some way, as depicted by data path 190. For example, PGW 162 can block the data session by rejecting the data session with a temporary error code, accept data packets from the data session and drop or otherwise discard the data packets without sending a response to the cellular device (e.g., send the data packets to a black hole), and/or take some other action to restrict the data session. If cellular operator A 120 is an allowed cellular operator, then proxy 144 determines that the data session should be routed to PGW 172 (which is a normal PGW), as indicated by data path 184. For example, PGW 172 can handle the data session normally, which can include sending network packets to their destination (e.g., within a destination network 192) and relaying return network packets back to the cellular device 110, as depicted by data path 188.

For example, whitelists and blacklists can comprise rules (e.g., rules that are based on the various types of metadata described herein, which can include country, cellular operator, location, etc.) and/or lists of PLMN codes. The following rule (which could be used in a whitelist and/or a blacklist) defines cellular networks as T-Mobile and Expeto using PLMN codes:

visited-plmn in (313260, 310260)

In some implementations, rule sets can be used, and each rule can be a composite of multiple checks (e.g., with a logical "and"). Multiple rules of the rule set can be checked together (e.g., with a logical "or"). For example, the following rule set would match the SIM card with IMSI 313260000000000 connecting to the T-Mobile network in the USA or any Apple iPhone 8 device (the first 8 characters of the IMEI is the TAC, identifying the manufacturer and model):

imsi is 313260000000000 and visited-plmn is 310260
    imei startsWith 35300009

In some implementations, the rules in the whitelists and/or blacklists are defined using a language (e.g., a domain specific language). The language uses a set of operations based on the various types of metadata described herein and compare such metadata to the runtime data available data during session establishment. Operations include, but are not limited to, 'is' (equals), 'startsWith', 'endsWith', 'in', 'greaterThan', lessThan', 'between' and 'regex'. Any one of these can be prefixed with 'not' to inverse result. These rules (as-is or in a compiled form) can be inspected on every single session establishment.

In some implementations, the data path from the cellular device can be switched from one PGW to another (e.g., after the cellular device has established a data session with one of the PGWs). For example, the data session from cellular device 110 to blocked PGW 162 can be switched (e.g., by the proxy 144 upon receiving a customer command) to PGW 172. Switching can be performed for a specific cellular device (e.g., based on the device's IMSI) or for an entire PGW. For example, blocked PGW 162 can be reconfigured to operate as a normal (unblocked) PGW.

To illustrate how switching can be performed, consider a cellular device that has been quarantined to a blocked PGW due to its location being in a blacklisted area and/or country (e.g., a cellular device that was leased to a customer in Canada but has appeared in the U.S.). After reviewing the situation, a determination is made that the cellular device should be allowed to operate in the blacklisted area and/or country (e.g., should be allowed to operate in the U.S.). Upon making this determination, the device is moved (e.g., by updating a blacklist policy or by updating a whitelist policy) allowing it to connect (e.g., moved to a normal PGW). As another example, consider a customer that has a multi-location/multi-geographic setup. In country A, the customer has two PGWs, one for employee devices and one for contractor devices. In country B, the customer also has two PGWs, one for employee devices and one for contractor devices. However, in country B, contractors are not allowed to use the service, so that PGW for contractor devices is blocked. At some point, the customer decides to allow contractors to use the service in country B, and the entire PGW is reconfigured to operate as a normal (not blocked) PGW.

While only one HSS and one proxy are depicted for ease of illustration, the example cellular telecommunications environments can include any number of HSSs and/or proxies, which can be located in various different countries. In addition, the example cellular telecommunications environments can include any number of PGWs.

Figure 2:
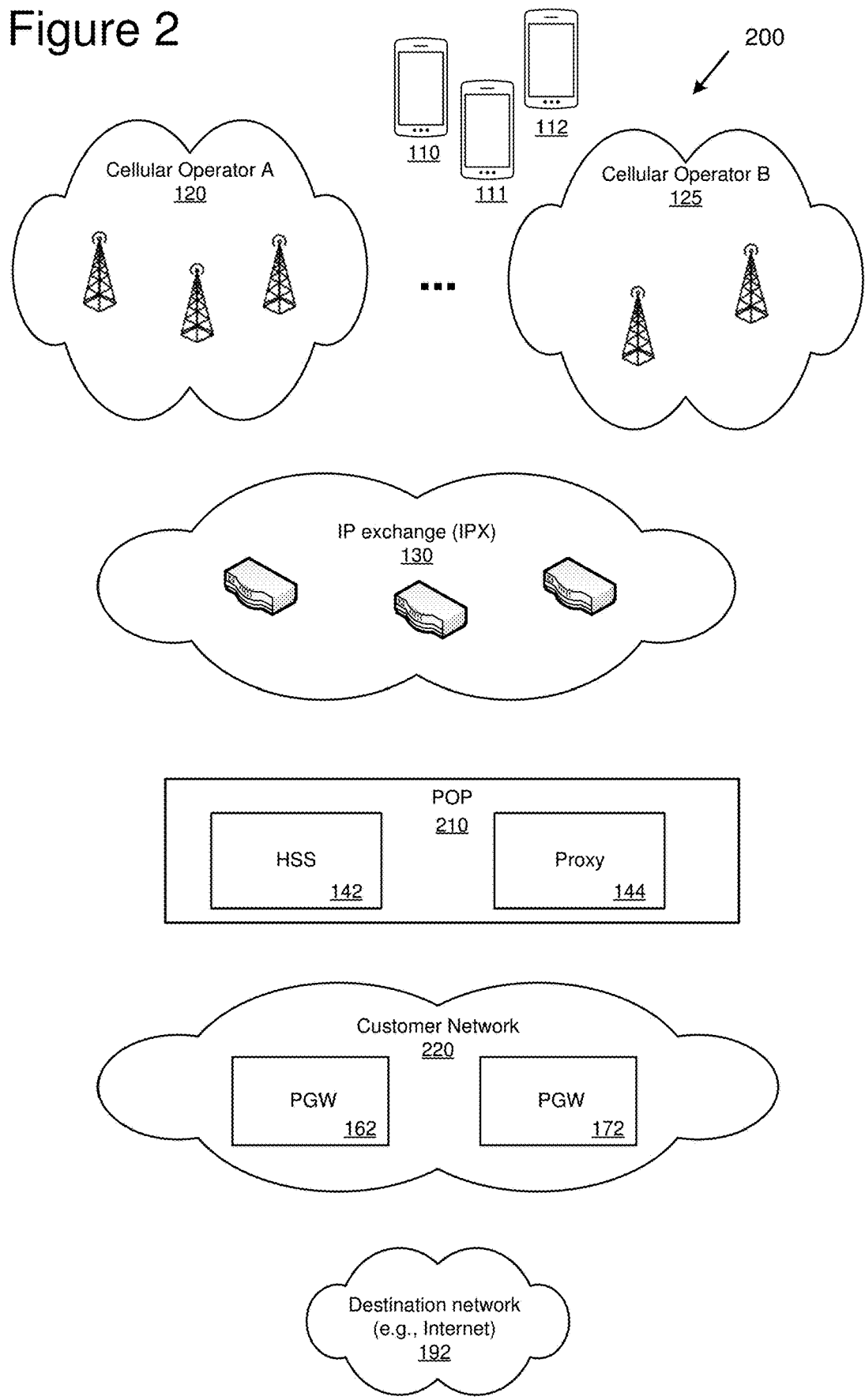
FIG. 2 is a diagram depicting an example cellular telecommunications environment, including a POP and a customer network.

FIG. 2 is a diagram depicting an example cellular telecommunications environment 200 that can be used for restricting data access for cellular network data. The example cellular telecommunications environment 200 is similar to the example cellular telecommunications environment 100, with some changes in organization of the entities.

Specifically, in the example cellular telecommunications environment 200 the HSS 142 and the proxy 144 are located within point of presence (POP) 210. For example, the POP can be located in a data center. The data center can be external to a customer network or within a customer network.

In the example cellular telecommunications network 200, the PGWs are located within customer network 220. A customer network can comprise local area networks, wide area networks, and/or other networks of the customer. A customer can be a particular business or organization. In general, the PGWs could be located in the same customer network in the same location (e.g., in the same data center) or in different locations. The PGWs could also be located in different customer networks or located outside of customer networks (e.g., located within a network of a service provider that provides restricted data access services to customers).

While only one POP and one customer network are depicted for ease of illustration, the example cellular telecommunications environments can include any number of POPs and/or customer networks, which can be located in various different countries.

Figure 3:
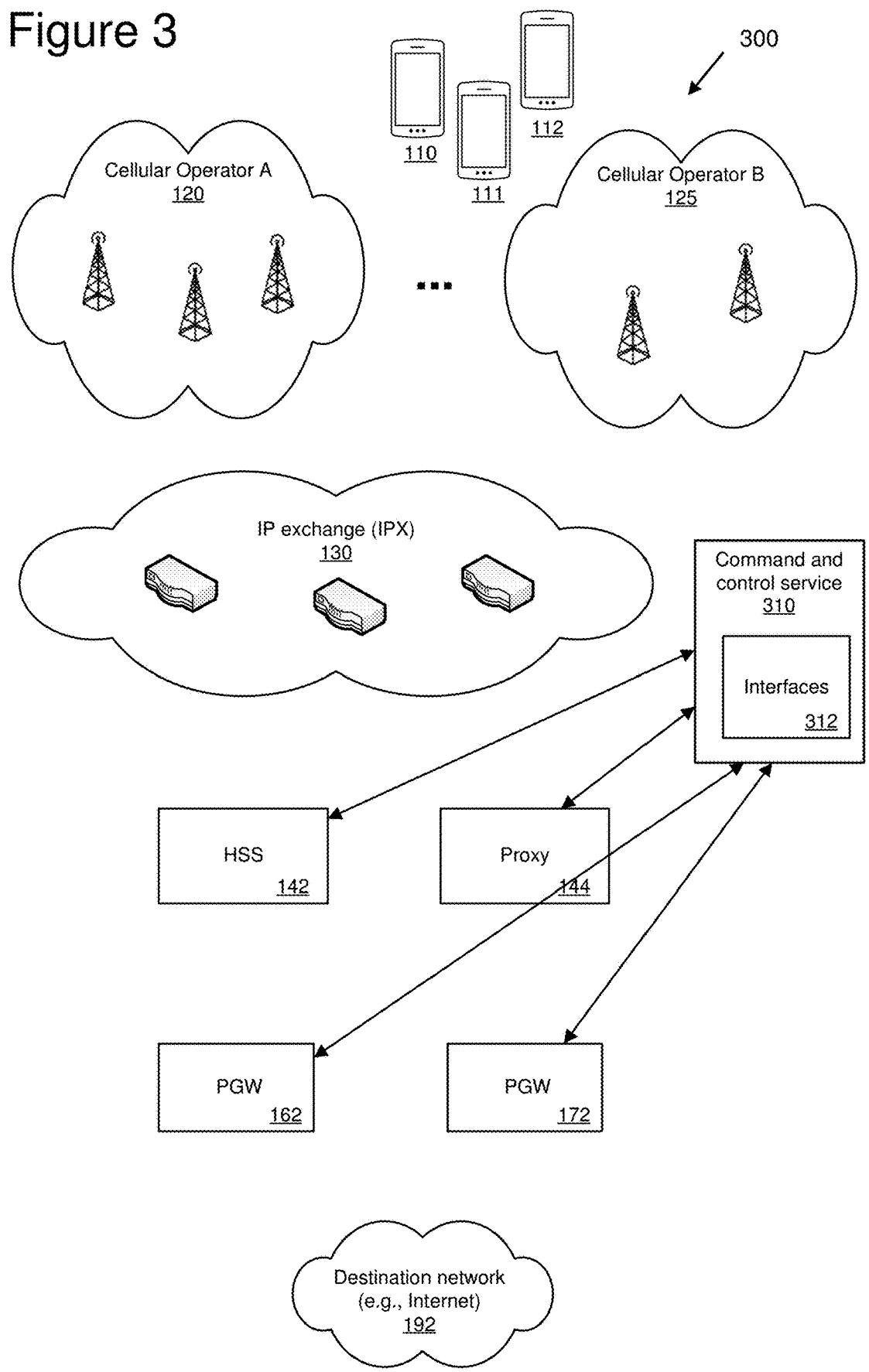
FIG. 3 is a diagram depicting an example cellular telecommunications environment, including a command and control service.

FIG. 3 is a diagram depicting an example cellular telecommunications environment 300 that can be used for restricting data access for cellular network data. The example cellular telecommunications environment 300 is similar to the example cellular telecommunications environment 100, with the addition of a command and control service 310.

The command and control service 310 is an optional entity that is present in some embodiments. The command control service 310 is a service that provides for management of various other entities of the example cellular telecommunications environment 300. The command and control service 310 includes interfaces 312 (e.g., user interfaces, such as graphical user interfaces (GUIs), APIs, and/or other types of computer user interfaces) that allow users and/or other computer services to manage the entities. For example, users can access the command and control service 310 via the interfaces 312 to create or modify policies controlling how the entities manage data paths and restrict data access.

The command and control service 310 communicates with the HSS 142, the proxy 144, and/or the PGWs 162 and 172. The command and control service can communicate directly with the entities and/or via agents. For example, the HSS 142 and the proxy 144 can be associated with an agent that is located (e.g., co-located) with the HSS 142 and the proxy 144.

In some implementations, the command and control service 310 generates configuration updates for the entities based on the instructions or policies it receives (e.g., via the interfaces 312). The configuration updates can be sent by the command and control service 310 to the entities (e.g., to the HSS 142, the proxy 144, the PGW 162, and/or the PGW 172), directly and/or via agents. For example, the command and control service 310 can generate configuration updates comprising indications of allowed cellular operators (e.g., a whitelist) and disallowed cellular operators (e.g., a blacklist). The command and control service 310 can send the configuration updates to the HSS 142 and/or proxy 144. The HSS 142 and/or proxy 144 can receive and apply the configuration updates.

The entities (e.g., the HSS 142, the proxy 144, the PGW 162, and/or the PGW 172) can also send information (e.g., monitoring and reporting data) back to the command and control service 310. The entities can send the information directly and/or via agents.

Methods for Restricting Data Access

In the technologies described herein, methods can be provided for restricting data access within cellular telecommunications environments. For example, cellular devices can be allowed to connect to disallowed cellular networks, but access can be restricted using various technologies.

Figure 4:
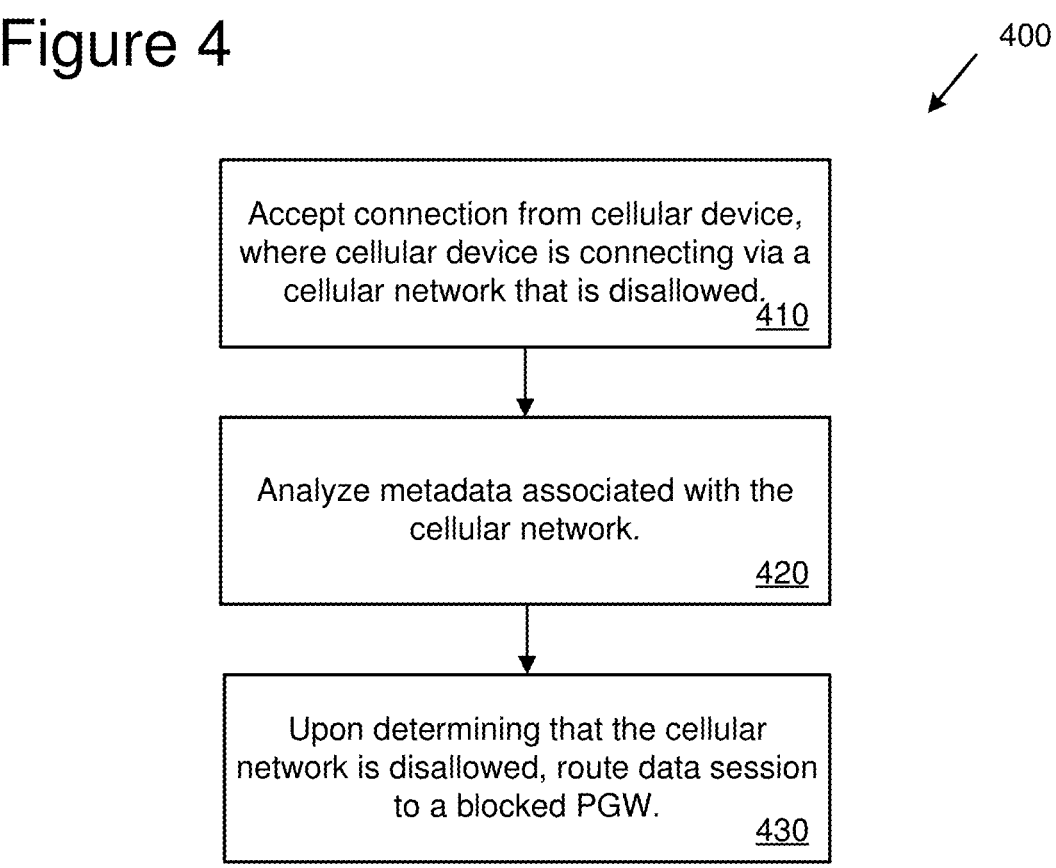
FIG. 4 is a flowchart of an example process for restricting data access within a cellular telecommunications environment.

FIG. 4 is a flowchart depicting an example process 400 for restricting data access within a cellular telecommunications environment. At 410, a cellular connection is accepted from a cellular device. The cellular device is connecting via a cellular network that is disallowed. The cellular connection is accepted regardless of whether the cellular device is connecting via the disallowed cellular network or is connecting via an allowed cellular network.

At 420, metadata associated with the cellular network is analyzed. For example, the metadata can comprise a PLMN code of the cellular network.

At 430, upon determining that the cellular network is disallowed, a data session of the cellular device is routed to a blocked PGW. For example, the blocked PGW can block or reject the data session.

The operations of the example process 400 can be implemented by various entities of the cellular telecommunications network. For example, operation 410 can be implemented by an HSS (e.g., by HSS 142), and operations 420 and 430 can be implemented by a proxy (e.g., by proxy 144). When the cellular device is connecting via a disallowed cellular operator, the proxy (e.g., proxy 144) can route the data session to a blocked PGW (e.g., PGW 162).

Figure 5:
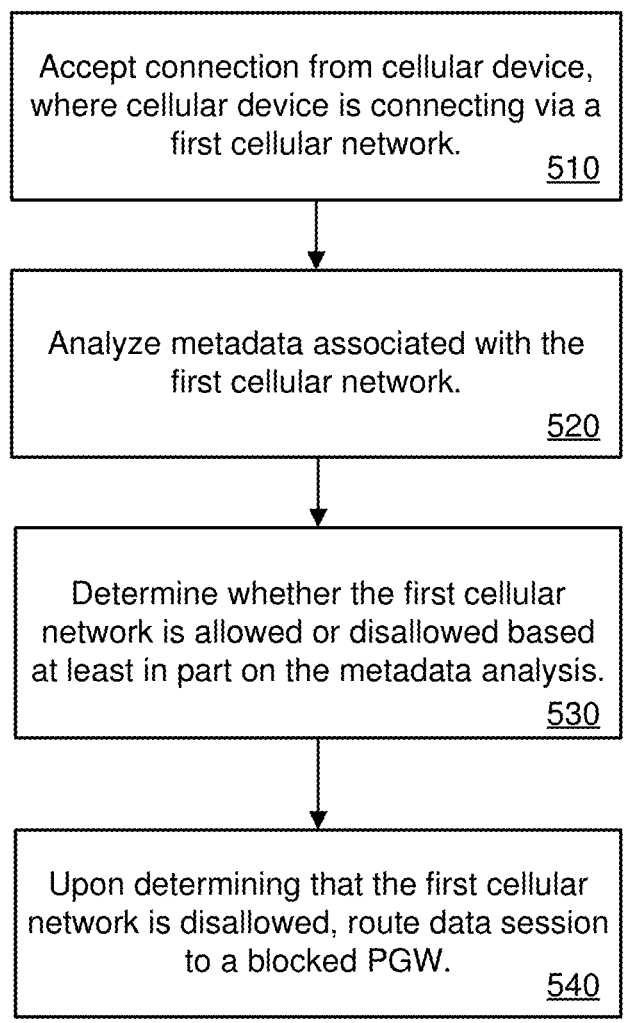
FIG. 5 is a flowchart of an example process for restricting data access within a cellular telecommunications environment.

FIG. 5 is a flowchart depicting an example process 500 for restricting data access within a cellular telecommunications environment. At 510, a cellular connection is accepted from a cellular device. The cellular device is connecting via a first cellular network. The cellular connection is accepted regardless of whether the first cellular network is an allowed cellular network or a disallowed cellular network.

At 520, metadata associated with the first cellular network is analyzed. For example, the metadata can comprise a PLMN code of the first cellular network. At 530 a determination is made whether the first cellular network is allowed or disallowed based at least in part on the metadata analysis. For example, indications (e.g., lists) of allowed and/or disallowed cellular networks can be maintained (e.g., identified by PLMN code), and the indications can be searched to determine whether the first cellular network is allowed or disallowed (e.g., by matching its PLMN code).

At 540, upon determining that the first cellular network is disallowed, a data session of the cellular device is routed to a blocked PGW. For example, the blocked PGW can block or reject the data session.

The operations of the example process 500 can be implemented by various entities of the cellular telecommunications network. For example, operation 510 can be implemented by an HSS (e.g., by HSS 142), and operations 520, 530, and 540 can be implemented by a proxy (e.g., by proxy 144). When the cellular device is connecting via a disallowed cellular operator, the proxy (e.g., proxy 144) can route the data session to a blocked PGW (e.g., PGW 162).

Figure 6:
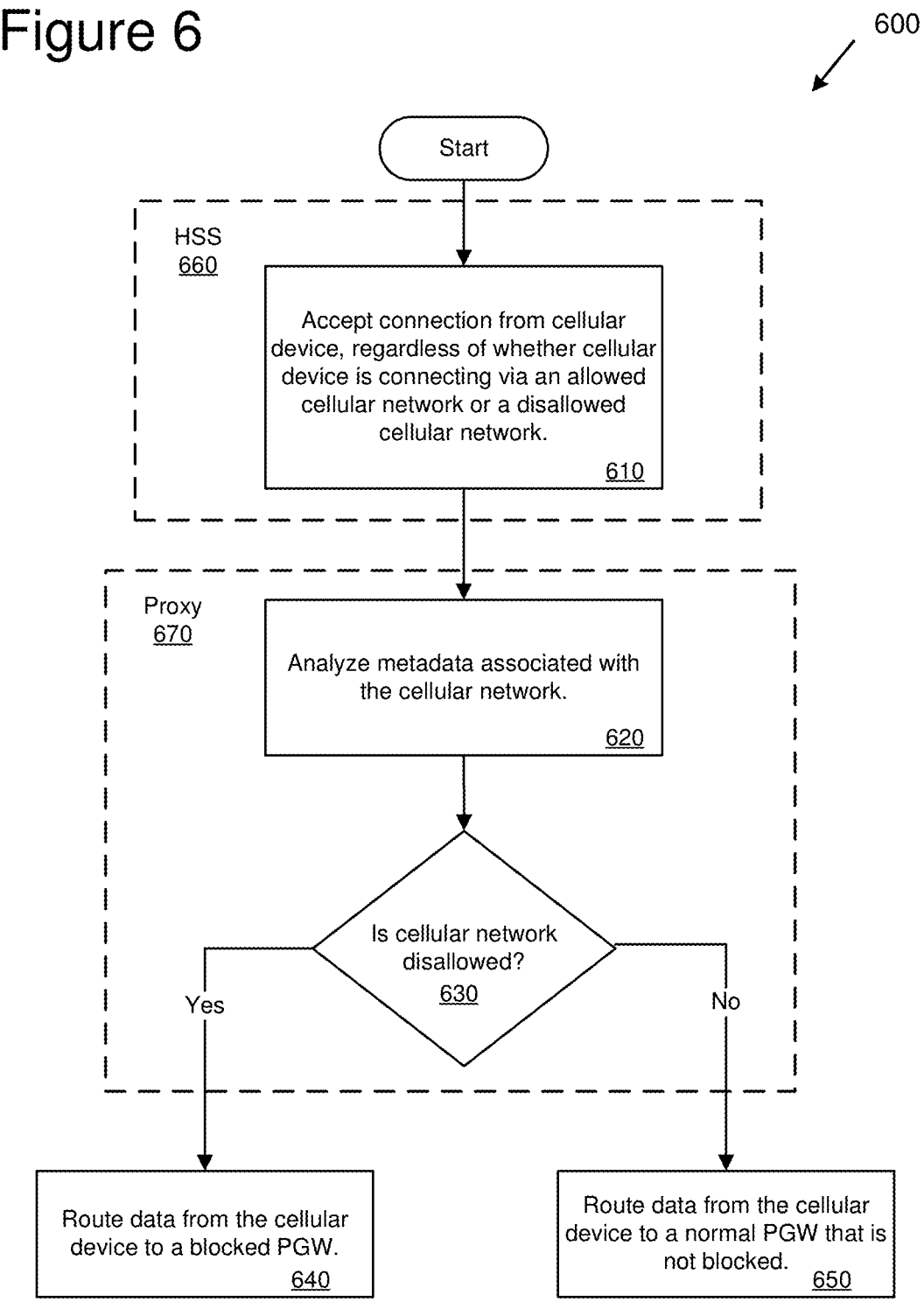
FIG. 6 is a flowchart of an example process for restricting data access within a cellular telecommunications environment.

FIG. 6 is a flowchart depicting an example process 600 for restricting data access within a cellular telecommunications environment. At 610, a cellular connection is accepted from a cellular device. The connection from the cellular device is accepted regardless of whether the cellular device is connecting via a cellular network that is allowed or a cellular network that is disallowed. In some implementations, the operation depicted at 610 is implemented by an HSS 660.

At 620, metadata associated with the cellular network is analyzed. For example, the PLMN code associated with the cellular network can be checked to determine whether the cellular network is allowed or disallowed.

At 630, the data from the cellular device is routed differently depending on whether the cellular network through which the cellular device is connected is allowed or disallowed. If the cellular network is disallowed, then the "yes" branch is followed, and data (e.g., a data session) for the cellular device is routed to a blocked PGW, as depicted at 640. However, if the cellular network is allowed, then the "no" branch is followed, and data (e.g., a data session) for the cellular device is routed to a normal PGW (that is not blocked), as depicted at 650. In some implementations, the operations depicted at 620 and 630 are preformed by a proxy 670.

Computing Systems

Figure 7:
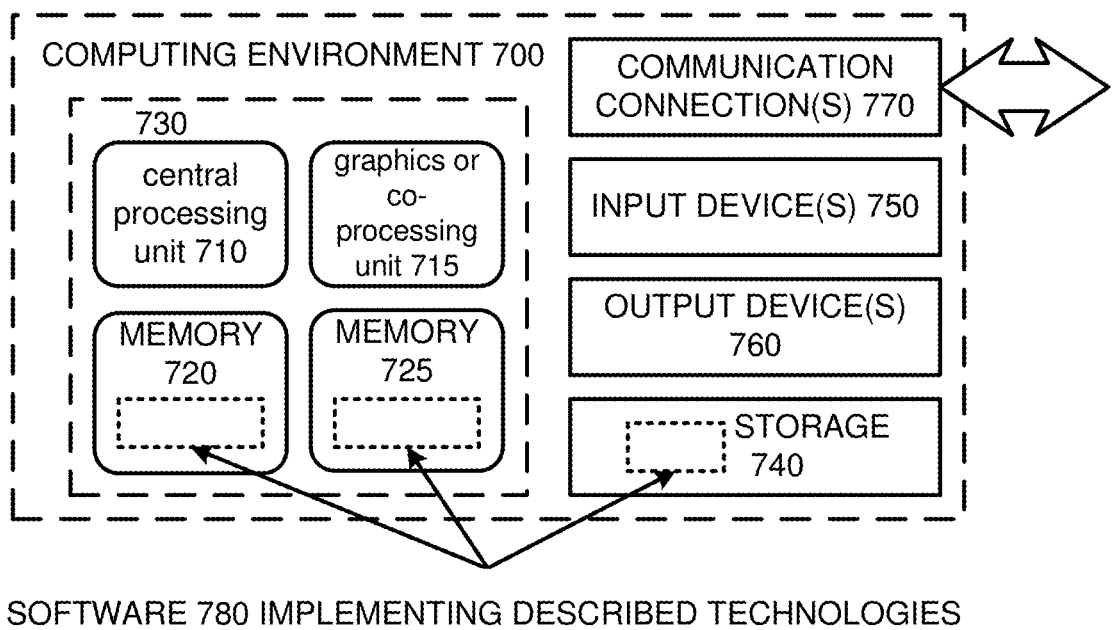
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 8:
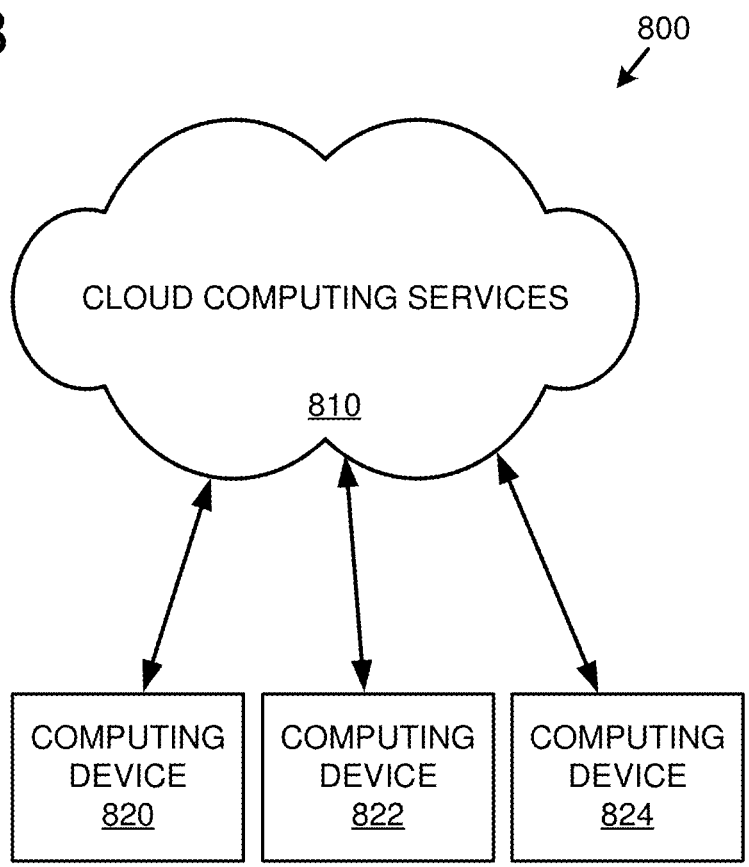
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, database resources, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections, such as 770.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for restricting data access within a cellular telecommunications environment, the method comprising:
   at a home subscriber server (HSS):
      accepting a connection from a cellular device, wherein the cellular device is connecting via a cellular network that is disallowed;
      wherein the connection from the cellular device is accepted by the HSS regardless of whether the cellular device is connecting via the disallowed cellular network or is connecting via an allowed cellular network;
   at a proxy:
      analyzing metadata associated with the cellular network; and
      upon determining that the cellular network is disallowed based on the analysis of the metadata, routing a data session of the cellular device to a blocked packet data network gateway (PGW), wherein the blocked PGW restricts the data session;
   at the HSS:
      accepting a connection from a second cellular device, wherein the second cellular device is connecting via the allowed cellular network; and
   at the proxy:
      analyzing metadata associated with the allowed cellular network; and
      upon determining that the allowed cellular network is allowed based on the analysis of the metadata, routing a data session of the second cellular device to an unblocked PGW, wherein the unblocked PGW does not restrict the data session.

2. The method of claim 1, further comprising:
   at the proxy:
      determining whether the cellular device is connecting via the disallowed cellular network or the allowed cellular network based at least in part on the analyzed metadata.

3. The method of claim 1, wherein analyzing the metadata comprises:
   analyzing a public land mobile network (PLMN) code associated with the cellular network; and
   determining that the PLMN code associated with the cellular network indicates that the cellular network is disallowed.

4. The method of claim 1, further comprising:
   receiving a command to switch the data session of the cellular device from the blocked PGW to the unblocked PGW; and
   responsive to receiving the command, switching the data session of the cellular device to the unblocked PGW, wherein the unblocked PGW is a normal PGW that does not restrict the data session.

5. The method of claim 1, further comprising:
   receiving a data structure indicating cellular networks that are allowed and a data structure indicating cellular networks that are disallowed;
   wherein analyzing the metadata comprises checking the data structures.

6. The method of claim 5, wherein the data structures are received from a command and control service.

7. The method of claim 1, further comprising:
   generating reporting data indicating the data session between the cellular device and the disallowed PGW; and
   sending the reporting data to a command and control service.

8. The method of claim 1, wherein the blocked PGW restricts the data session by rejecting the data session with a temporary error code.

9. The method of claim 1, wherein the blocked PGW accepts data packets from the data session and drops the data packets without sending a response to the cellular device.

10. The method of claim 1, further comprising:
    determining that the cellular device is located in a disallowed country based at least in part on the connection via the disallowed cellular network.

11. The method of claim 1, wherein the disallowed cellular network is not a preferred cellular network for the cellular device.

12. The method of claim 1, wherein the HSS and the proxy are located external to the cellular network.

13. One or more computing devices comprising:
    processors; and
    memory;
    the one or more computing devices configured, via computer-executable instructions, to perform operations for restricting data access within a cellular telecommunications environment, the operations comprising:
       at a home subscriber server (HSS):
          accepting a connection from a cellular device, wherein the cellular device is connecting via a first cellular network;
          wherein the connection from the cellular device is accepted regardless of whether the first cellular network is a disallowed cellular network or an allowed cellular network;
       at a proxy:
          analyzing metadata associated with the first cellular network;
          determining whether the first cellular network is a disallowed cellular network or an allowed cellular network based at least in part on the analysis of the metadata; and
          upon determining that the first cellular network is a disallowed cellular network, routing a data session of the cellular device to a blocked packet data network gateway (PGW), wherein the blocked PGW restricts the data session;
       at the HSS:
          accepting a connection from a second cellular device, wherein the second cellular device is connecting via a second cellular network; and
       at the proxy:
          analyzing metadata associated with the second cellular network;

determining whether the second cellular network is a disallowed cellular network or an allowed cellular network based at least in part on the analysis of the metadata; and upon determining that the second cellular network is an allowed cellular network, routing a data session of the second cellular device to an unblocked PGW, wherein the unblocked PGW does not restrict the data session of the second cellular device.

14. The one or more computing devices of claim 13, wherein analyzing the metadata associated with the first cellular network comprises:

analyzing a public land mobile network (PLMN) code associated with the first cellular network; and determining that the PLMN code associated with the first cellular network indicates that the first cellular network is disallowed.

15. The one or more computing devices of claim 13, wherein the blocked PGW restricts the data session by rejecting the data session with a temporary error code.

16. The one or more computing devices of claim 13, wherein the blocked PGW accepts data packets from the data session and drops the data packets without sending a response to the cellular device.

17. One or more computer-readable storage media storing computer-executable instructions for execution on one or more computing devices to perform operations for restricting data access within a cellular telecommunications environment, the operations comprising:

at a home subscriber server (HSS):

accepting a connection from a cellular device, wherein the cellular device is connecting via a first cellular network;

wherein the connection from the cellular device is accepted regardless of whether the first cellular network is a disallowed cellular network or an allowed cellular network;

at a proxy:

analyzing metadata associated with the first cellular network;

determining whether the first cellular network is a disallowed cellular network or an allowed cellular network based at least in part on the analysis of the metadata; and upon determining that the first cellular network is a disallowed cellular network, routing a data session of the cellular device to a blocked packet data network gateway (PGW), wherein the blocked PGW either blocks or rejects the data session;

at the HSS:

accepting a connection from a second cellular device, wherein the second cellular device is connecting via the allowed cellular network; and at the proxy:

analyzing metadata associated with the allowed cellular network; and upon determining that the allowed cellular network is allowed based on the analysis of the metadata, routing a data session of the second cellular device to an unblocked PGW, wherein the unblocked PGW does not restrict the data session.

18. The one or more computer-readable storage media of claim 17, wherein analyzing the metadata associated with the first cellular network comprises:

analyzing a public land mobile network (PLMN) code associated with the first cellular network; and determining that the PLMN code associated with the first cellular network indicates that the first cellular network is disallowed.

* * * * *